United States Patent
Miyajima et al.

(10) Patent No.: US 6,853,532 B2
(45) Date of Patent: Feb. 8, 2005

(54) APPARATUS AND METHOD FOR DRIVING ACTUATOR

(75) Inventors: Hiroshi Miyajima, Hachioji (JP); Hideharu Miyahara, Hachioji (JP)

(73) Assignee: Olympus Corporation, Tokyo (JP)

( * ) Notice: Subject to any disclaimer, the term of this patent is extended or adjusted under 35 U.S.C. 154(b) by 318 days.

(21) Appl. No.: 09/921,520

(22) Filed: Aug. 2, 2001

(65) Prior Publication Data

US 2002/0051332 A1 May 2, 2002

(30) Foreign Application Priority Data

Sep. 26, 2000 (JP) ........................................ 2000-292937

(51) Int. Cl.⁷ .................... H01H 47/32; G02B 26/08
(52) U.S. Cl. .................... 361/187; 361/187; 359/212
(58) Field of Search .................... 361/187, 182, 361/185; 359/212, 213, 214, 199

(56) References Cited

U.S. PATENT DOCUMENTS

| | | | | |
|---|---|---|---|---|
| 4,088,982 A | * | 5/1978 | Haas | 382/137 |
| 4,502,752 A | * | 3/1985 | Montagu | 359/199 |
| 5,168,203 A | | 12/1992 | Tepavcevic | |
| 5,184,002 A | * | 2/1993 | Chu | 235/454 |
| 5,247,384 A | * | 9/1993 | Inoue et al. | 359/199 |
| 5,694,237 A | * | 12/1997 | Melville | 359/214 |
| 5,739,651 A | | 4/1998 | Miyazawa et al. | |
| 5,835,251 A | * | 11/1998 | Toda et al. | 359/198 |
| 6,232,861 B1 | * | 5/2001 | Asada | 335/222 |
| 2002/0163675 A1 | * | 11/2002 | Sakai | 358/474 |

FOREIGN PATENT DOCUMENTS

EP 0 692 729 A1 1/1996

* cited by examiner

*Primary Examiner*—Stephen W. Jackson
*Assistant Examiner*—Danny Nguyen
(74) *Attorney, Agent, or Firm*—Scully, Scott, Murphy & Presser (57) ABSTRACT

The present invention relates to an actuator drive apparatus capable of eliminating the influence of the mutual induction effect of a drive coil and a detection coil with a simple structure. That is, the present invention is an actuator drive apparatus capable of causing a movement of the drive coil of a scanner by applying an electric current thereto, and generating and maintaining the resonance state by feeding back an output signal of the detection coil at that moment. In particular, the present invention uses a rectangular wave as the drive signal and includes an LPF for eliminating a specific high frequency component of an output signal of the detection coil.

10 Claims, 5 Drawing Sheets

F I G. 5A — Mutual induction component

APPARATUS AND METHOD FOR DRIVING ACTUATOR

CROSS-REFERENCE TO RELATED APPLICATIONS

This application is based upon and claims the benefit of priority from the prior Japanese Patent Application No. 2000-292937, filed Sep. 26, 2000, the entire contents of which are incorporated herein by reference.

BACKGROUND OF THE INVENTION

The present invention relates to an apparatus and a method having or using a movable section, a fixed section, an elastic member for connecting the movable section with the fixed section, magnetic field generating means, a drive coil, a detection coil and others, and more particularly to an apparatus and a method for driving an actuator by which the movable section is constantly vibrated in the resonance state.

Heretofore, as an example of an electromagnetic actuator, there has been, for example, an actuator used in an optical pickup. This is used for performing tracking control with a vibrating mirror. In this actuator, both a mirror drive coil and a mirror vibration detection coil are provided on the movable section, and a magnet is provided on the fixed section. When an electric current is applied to the actuator drive coil, the mirror is driven by a Lorentz force. At this time, the induced electromotive force prosectional to a speed is generated in order that the detection coil makes a movement in the magnetic field. This induced electromotive force serves as a vibration detection signal.

The structure in which two kinds of coils are fixed at positions close to each other and arranged in the movable section in this manner will be considered. In this structure, an electromotive force is generated to the vibration detection coil besides the induced electromotive force prosectional to a speed. This is the electromotive force caused due to the mutual induction action of both the coils when a change in the electric current applied to the drive coil occurs.

Figure 1:
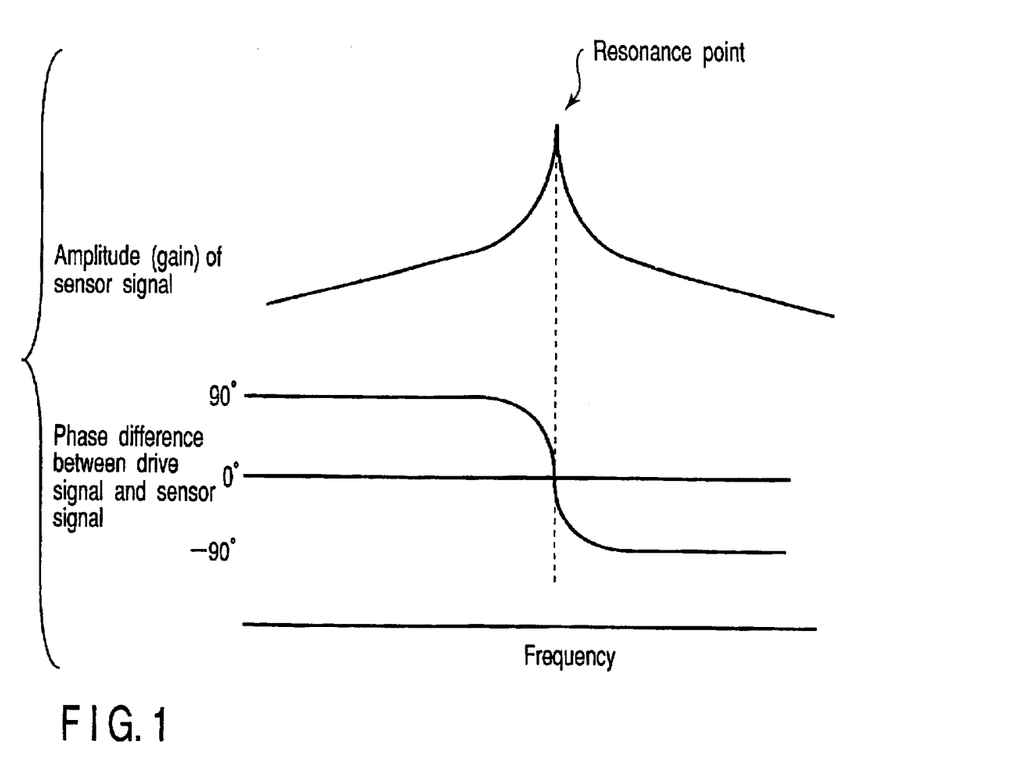
FIG. 1 is a view showing a frequency response characteristic of a sensor (angular velocity) signal relative to a drive signal.

Here, FIG. 1 shows a frequency response characteristic of a sensor (angular velocity) signal relative to a drive signal. A horizontal axis represents a frequency. In this example, the logarithm is shown. An amplitude of the sensor signal is also shown in terms of the logarithm (dB).

When a frequency of the drive signal becomes a specific frequency (resonant frequency), an amplitude of the sensor signal becomes maximum. At this time, a deflection angle also becomes maximum.

Meanwhile, the frequency response characteristic shown in FIG. 1 shows an ideal state. However, since the drive coil and the detection coil are actually contiguous with each other, the signal caused due to mutual induction of both the coils is disadvantageously included in the sensor signal.

That is, the magnetic field whose direction is substantially vertical to the mirror plane is generated in the drive coil when it is assumed that the electric current flowing to the drive coil is determined as follows:

$$I = I_0 \sin \omega t \quad (1)$$

Since it can be considered that the magnetic flux density of that magnetic field is substantially prosectional to the electric current, it is possible to determine as follows:

$$B = KI = KI_0 \sin \omega t = B_0 \sin \omega t \quad (2)$$

(K=Proportional Number)

On the other hand, the magnetic filed represented by the expression (2) is generated in the detection coil. Further, the induced electromotive force is produced by the electromagnetic induction in order to realize changes with time. Assuming that the magnetic field in the detection coil is approximately uniform at the value of the expression (2) and an internal area of the detection coil is A, the generated electromotive force is expressed as follows:

$$V = -(dBA/dt) = -\omega B_0 A \cos \omega t \quad (3)$$

Since the signal obtained by the mutual induction action is a signal irrespective of the vibration, it is not desirable that this signal is included in the vibration detection signal.

In light of the above-described point, Japanese Patent Application KOKAI Publication No. 64-2015 discloses a technique concerning a vibration mirror apparatus. This apparatus provides a third coil to the fixed section and negatively feeds back the electromotive force output caused due to the mutual induction action of the drive coil and the third coil to an output of the vibration detection coil. As a result, only the induced electromotive force prosectional to a speed is detected.

Furthermore, Japanese Patent Application KOKOKU Publication No. 7-70083 discloses a technique concerning the vibration mirror apparatus. In this apparatus, the drive coil is arranged inside a closed magnetic circuit and the detection coil is arranged outside the closed magnetic circuit, respectively. Decreasing the mutual induction action between both the coils generates only the induced electromotive force prosectional to a substantial speed in the detection coil.

However, in the technique disclosed in Japanese Patent Application KOKAI Publication No. 64-2015, since a coil must be newly provided to the fixed section, the structure becomes complicated, which may be an obstacle for reduction in cost and size. Moreover, a positions of the detection coil and the third coil relative to the drive coil are different from each other in a narrow sense, and the mutually-induced electromotive force differs. Thus, the unnecessary signal component can not be completely removed.

In addition, in the technique disclosed in Japanese Patent Application KOKOKU Publication No. 7-70083, the magnetic shield effect of the closed magnetic circuit is utilized, but this is not perfect. Therefore, the mutually-inductive electromotive force of the drive coil and the detection coil can not be completely removed. Additionally, it is most effective to arrange both the coils at positions far from an oscillating axis by nature, whereas the magnetic circuit must be arranged between both the coils in this conventional technique. Accordingly, optimization of the coil positions is difficult.

BRIEF SUMMARY OF THE INVENTION

In view of the above-described problems, it is an object of the present invention to provide an actuator drive apparatus capable of eliminating the influence of the mutual induction effect of the drive coil and the detection coil with a simple structure.

To achieve this aim, in a first mode according to the present invention, there is provided an actuator drive apparatus comprising: a movable section; a fixed section, an elastic member for connecting the movable section with the fixed section; a magnetic field generation member; a drive coil; a detection coil; a control circuit for applying a drive signal having a rectangular wave to the drive coil, the movable section thereby making a movement relative to the fixed section in the resonance state, the control circuit thereby maintaining the movement of the movable section relative to the fixed section in the resonance state; and a high frequency elimination circuit for eliminating a specific high frequency component of an output signal of the detection coil.

In a second mode, there is provided an actuator drive apparatus for driving an actuator consisting of a movable section, a fixed section, an elastic member for connecting the movable section with the fixed section, a magnetic field generation member, a drive coil, and a detection coil, the actuator drive apparatus comprising: a control circuit for applying a drive signal having a rectangular wave to the drive coil, the movable section thereby making a movement relative to the fixed section in the resonance state, and the control circuit feeding back an output signal from the detection coil to the drive signal, the movement of the movable section relative to the fixed section thereby being maintained in the resonance state; and a high frequency elimination circuit for eliminating a specific high frequency component of an output signal of the detection coil.

In a third mode, there is provided an actuator drive method for resonating and driving an actuator including a movable section, a fixed section, an elastic member for connecting the movable section with the fixed section, a magnetic field generation member, a drive coil, and a detection coil, the actuator drive method comprising: a step of applying a drive signal having a rectangular wave to the drive coil; a step of eliminating a specific high frequency component of an output signal of the detection coil; and a step of feeding back an output signal, from which the specific high frequency component is eliminated, to the drive signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A basic principle concerning an actuator drive apparatus according to the present invention will be first described for a better understanding of the embodiments of the present invention.

An example of an actuator to which the present invention is applied will first be explained.

Figure 2:
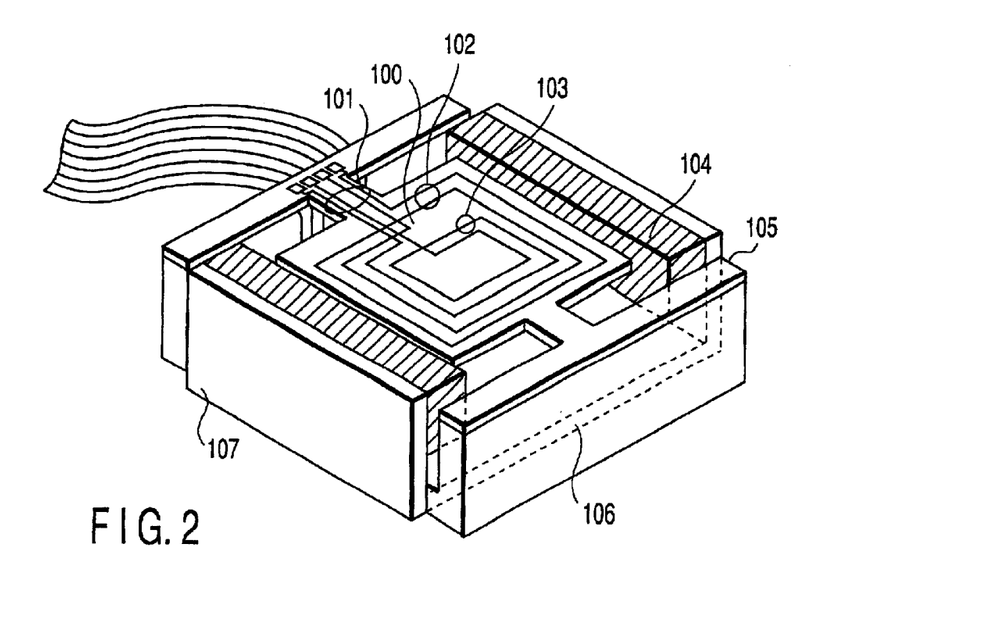
FIG. 2 is a structural view of an electromagnetic optical scanner manufactured by using a micromachining technique.

FIG. 2 illustrates a structural example of an electromagnetic optical scanner manufactured by using a micromachining technique hereinafter. With reference to this drawing, a description will be given as to the principle of generation of electromotive force caused due to the mutual induction action when a drive coil and a detection coil are contiguously arranged.

As shown in FIG. 2, in this electromagnetic optical scanner, permanent magnets 104 are arranged on both sides of a mirror 100. This permanent magnet 104 is fixed to a yoke 107. The mirror 100 has a reflection plane formed on a surface side in the drawing. On the back side in the drawing are formed a drive coil 102 and a detection coil 103. Further, the mirror 100 is connected to a support 105 through a torsion bar 101.

In this electromagnetic optical scanner, the support 105, the torsion bar 101, the mirror 100, the drive coil 102 and the detection coil 103 are integrated by a silicon micromachining technique. After forming them, a wafer is diced. The die is bonded to a base frame 106. A magnetic circuit consisting of the permanent magnets 104 and the yokes 107 is fixed to the base frame 106. Then, the structure is completed.

In such a structure, when an alternating signal is applied to the drive coil 102, a Lorentz force acts according to the mutual relationship between the magnetic field invoked by the permanent magnets 104 and the electric current flowing to the drive coil 102. When the Lorentz force acts, the mirror 100 connected to the support 105 through the torsion bar 101 rotates around a shaft extending through the torsion bar 101.

The alternating signal is applied to the drive coil 102. Therefore, when a direction of the electric current is reversed, a direction along which the Lorentz force acts is reversed. As a result, the mirror 100 rotates around the shaft extending through the torsion bar 101 in the reverse direction.

Accordingly, when the alternating signal is applied to the drive coil 102, the rotating direction of the mirror 100 is reversed in accordance with the alternating signal applied thereto. Further, the mirror 100 is vibrated in a fixed cycle in accordance with a frequency of the alternating signal.

On the other hand, an electromotive force prosectional to an angular velocity is generated to the detection coil 103 by Faraday's law. This becomes a sensor signal.

When the reflection plane of the mirror 100 is irradiated with a laser beam from a light source (not shown), the mirror 100 reflects the laser beam. Since the mirror 100 vibrates in a fixed cycle in accordance with the alternating signal, the reflected laser beam scans in a one-dimensional direction.

It is to be noted that the mirror 100 of this electromagnetic optical scanner has an inherent resonant frequency determined by a structure or a material of a spring. In the case of driving with a constant electric current, a deflection angle becomes maximum when a frequency of the drive signal matches with the resonant frequency.

Figure 3:
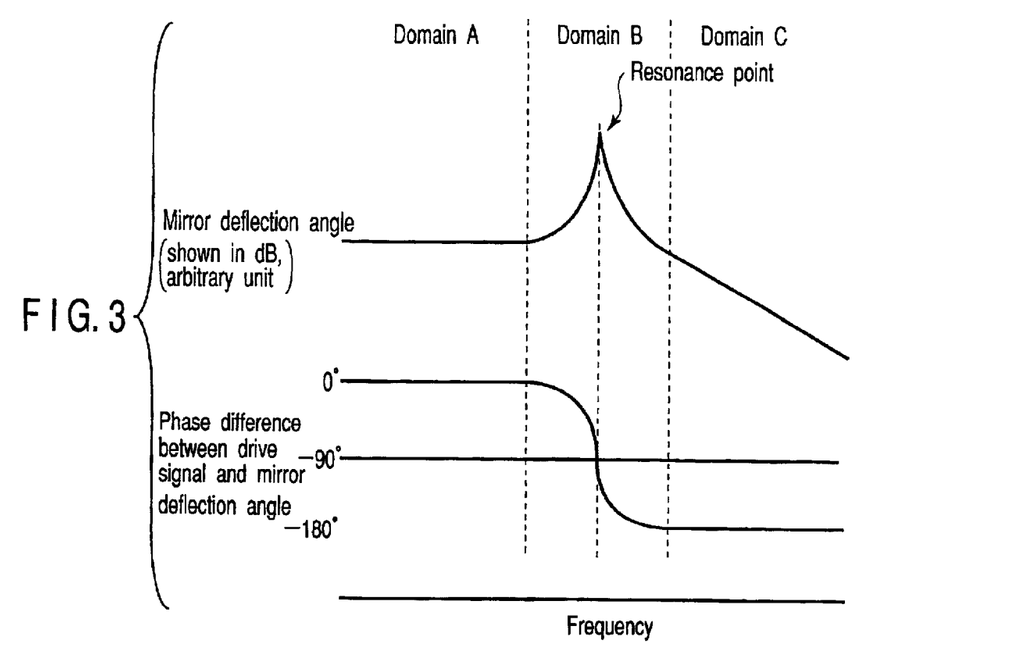
FIG. 3 is a view showing a frequency response characteristic of a drive frequency—a deflection angle when the electromagnetic optical scanner is driven with an alternating electric current having a sinusoidal wave.

Here, the frequency response characteristic of a drive frequency—a deflection angle when the electromagnetic optical scanner is driven with an alternating current having a sinusoidal wave is as shown in FIG. 3.

As illustrated in FIG. 3, a description will now be given in detail as to the behavior in the respective three domains A to C obtained by dividing the domain in accordance with the frequency band.

At first, a domain A is a frequency which is sufficiently lower than the resonant frequency. In this domain, the deflection angle does not depend on the frequency, and there is no phase difference between the drive signal and the deflection angle. That is, the behavior of the electromagnetic optical scanner basically follows the drive signal.

A domain B is a frequency in the vicinity of the resonant frequency. In this domain, an increase in the deflection angle and a phase delay are generated, and the behavior of the electromagnetic optical scanner does not necessarily follow the drive signal. That is, the deflection angle of the electromagnetic optical scanner is influenced by a frequency or a damping ratio.

A domain C is a frequency which is sufficiently higher than the resonant frequency. In this domain, the influence of the spring can be basically ignored. That is, if the drive force is fixed, it is possible to respond in such a manner that the angular acceleration of the electromagnetic scanner can be constant.

To sum up, the gain of the deflection angle is extremely high with the resonant frequency, and the deflection angle is then rapidly decreased in the high frequency domain. That is because it can be considered that a response is made in such a manner that the angular acceleration can be constant.

In the actuator drive apparatus according to the embodiment of the present invention, the electromagnetic optical scanner and the like having the frequency response characteristic shown in FIG. 3 is driven with the alternating current having a rectangular wave. The drive principle in this case can be considered as follows.

That is, the rectangular wave can be obtained by synthesization of sinusoidal waves having some frequency components and can be decomposed into each frequency component by performing a Fourier series development.

For example, it is assumed that the resonant frequency is fr and there is the rectangular wave function expressed as follows:

[Expression 1]

$$I(t) = I_0 \left( 0 < t < \frac{1}{2f_r} \right) \quad (4)$$

$$I(t) = -I_0 \left( \frac{1}{2f_r} < t < \frac{1}{f_r} \right)$$

By performing a Fourier series development, the above rectangular wave function can be expressed as follows:

[Expression 2]

$$I(t) = \frac{4I_0}{\pi} \left( \sin 2\pi f_r t + \frac{1}{3} \sin 6\pi f_r t + \frac{1}{5} \sin 10\pi f_r t + \cdots \right) \quad (5)$$

Figure 4A:
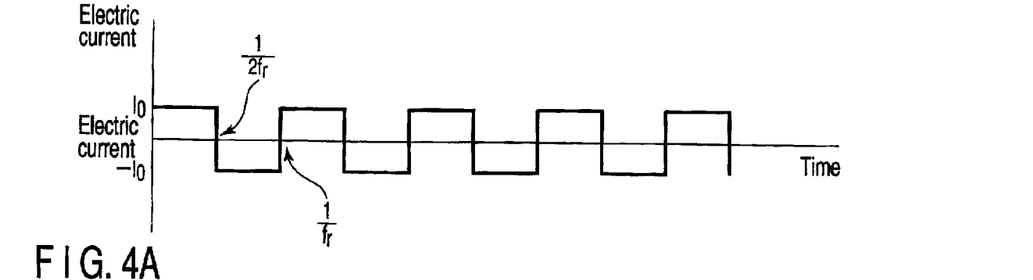
FIG. 4A is a view showing a rectangular wave function in a time domain.
Figure 4B:
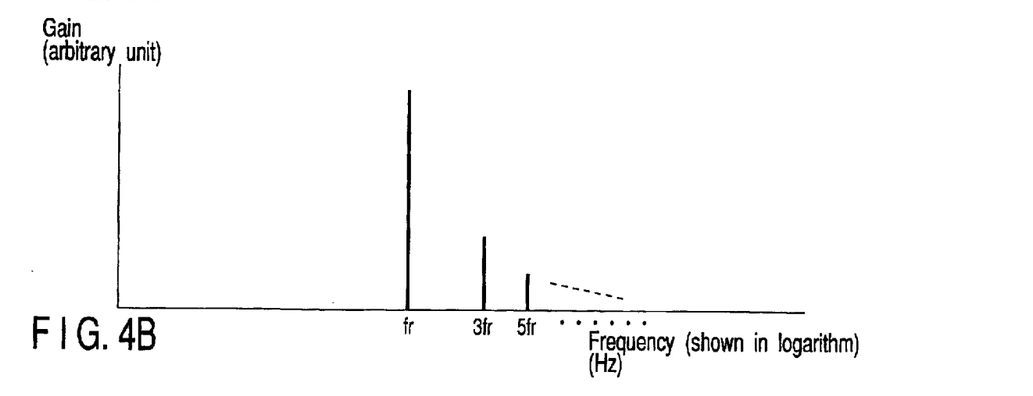
FIG. 4B is a view showing a rectangular wave function in a frequency domain.

Here, FIGS. 4A and 4B show the rectangular wave function in the time domain I(t) and the same in the frequency domain, respectively.

As is apparent from FIGS. 4A and 4B, when the drive signal is decomposed into each frequency component, the synthesis of responses of the electromagnetic optical scanner to respective frequencies becomes a response of the electromagnetic optical scanner to the drive signal having the rectangular wave.

At this time, according to the expression (4), the frequency components of the rectangular wave signal are fr, 3fr, 5fr, . . . and any frequency other than the resonant frequency belongs to the domain C in FIG. 2, and a coefficient value in the expression (5) also becomes small.

Thus, the response of the electromagnetic optical scanner relative to these frequency components can be substantially ignored as compared with the response to the resonant frequency component.

Therefore when driving with the resonant frequency, it can be understood that the response of the electromagnetic optical scanner has a substantially sinusoidal waveform even if the drive waveform is a rectangular wave.

An output from the detection coil in the rectangular wave driving will now be described.

According to the expression (3), it can be understood that the signal obtained by the mutual induction action is prosectionate to a percentage change of the magnetic flux passing through the inside of the detection coil with time.

In the meantime, in driving with the rectangular wave, the electric current flowing through the drive coil suddenly changes at the leading edge or the trailing edge of the rectangular wave, but it becomes constant in any other timing. Therefore, the signal obtained by the mutual induction action is also generated only in timing synchronized with the leading edge or the trailing edge of the rectangular wave.

On the other hand, since the response of the electromagnetic optical scanner is substantially sinusoidal, the original detection signal is basically the same as that in the case of driving with the sinusoidal wave.

Figure 5A:
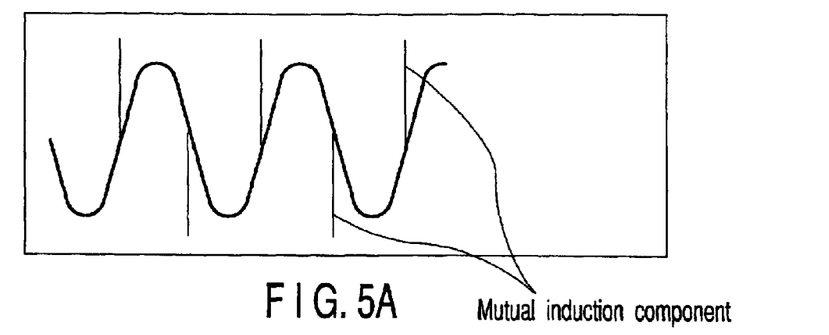
FIG. 5A is a view showing a detection signal obtained by rectangular wave driving.

Accordingly, in driving with the rectangular wave, such a detection signal as shown in FIG. 5A can be obtained. Here, FIG. 5B shows the detection signal in sinusoidal wave driving for comparison with FIG. 5A.

Referring to FIG. 5A, when the electromagnetic optical scanner is driven with the rectangular wave, the mutual induction component appears in a short period of time in timing synchronized with the leading edge or the trailing edge of the drive waveform. However, it can be understood that the influence of the mutual induction effect does not occur in timing other than the leading edge and the trailing edge of the drive waveform.

Figure 5B:
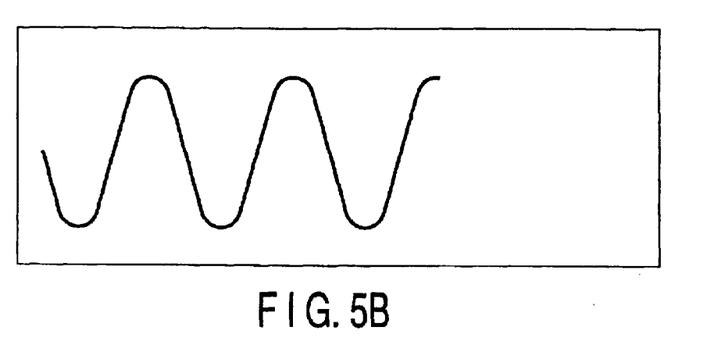
FIG. 5B is a view showing a detection signal obtained by sinusoidal wave driving.

It is to be noted that the detection signal shown in FIG. 5B has a substantially sinusoidal waveform but it has a waveform narrowly-deflected from the sinusoidal wave due to the influence of the mutual induction.

The present invention is achieved based on the principle mentioned above. Only the detection signal in a period in which the mutual induction component appears is eliminated by the high frequency eliminating means. Consequently, the present invention is characterized in that the detection signal which is not affected by the mutual induction is obtained.

Based on the principle mentioned above, the embodiments according to the present invention will now be described in detail.

Figure 6:
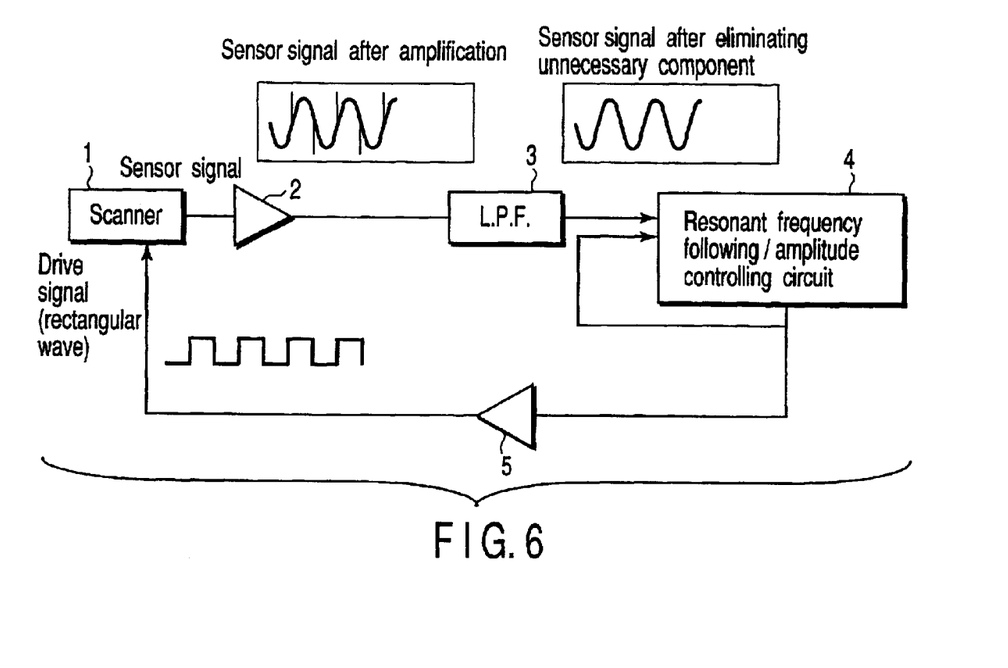
FIG. 6 is a block diagram showing the structure of an actuator drive apparatus according to a first embodiment of the present invention.

FIG. 6 is a block diagram showing a structure of an actuator drive apparatus according to a first embodiment of the present invention. As shown in FIG. 6, an output of a scanner 1 is connected to an input of a resonant frequency following/amplitude controlling circuit 4 through an amplifier 2 and a low pass filter (LPF; Low Pass Filter) 3. Further, an output of the resonant frequency following/amplitude controlling circuit 4 is fed back to its input. Furthermore, the output of the resonant frequency following/amplitude controlling circuit 4 is connected to an input of the scanner 1 through a driver amplifier 5.

In this structure, when the scanner 1 is moving, a sensor signal prosectional to its angular velocity is output. Then, the sensor signal is amplified by the amplifier 2. Here, if a drive signal of the scanner 1 has a rectangular wave, as indicated as "SENSOR SIGNAL AFTER AMPLIFICATION" in the drawing, the sensor signal including a pulse to which a component of the mutual induction is reflected can be obtained in a short period of time in the vicinity of a neutral position of the signal level.

When this signal is transmitted through the LPF 3, there can be obtained a sensor signal having a sinusoidal wave from which the pulse having the mutual induction component reflected thereto is removed as an output from the LPF 3 as indicated by "SENSOR SIGNAL AFTER ELIMINATING UNNECESSARY COMPONENT".

Figure 7:
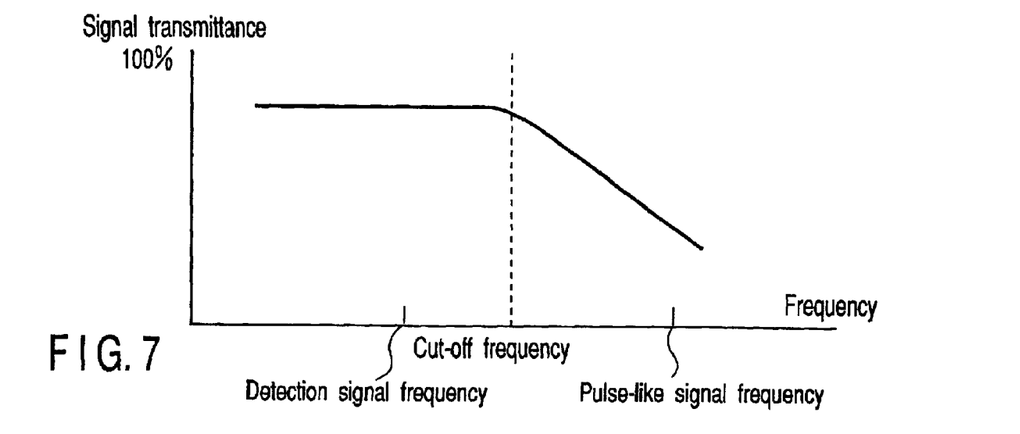
FIG. 7 is a view showing a frequency response characteristic example of an LPF 3.

FIG. 7 is a view showing a frequency response characteristic example of the LPF 3.

In the drawing, a horizontal axis represents a frequency and a vertical axis shows a transmittance (gain) of the signal.

In this LPF 3, the signal having a frequency component lower than a cut-off frequency is transmitted at substantially 100%. The transmittance of the signal having a frequency component not less than the cut-off frequency is decreased as the frequency becomes higher.

Therefore, as shown in FIG. 7, by setting the cut-off frequency of the LPF 3 in such a manner that the resonant frequency (the frequency of the original sensor signal) of the scanner 1 becomes lower than the cut-off frequency and the frequency component of the pulse obtained by the mutual induction component becomes higher than the cut-off frequency, only the original sensor signal component can be extracted.

When this signal is input to the resonant frequency following/amplitude controlling circuit 4, the resonant frequency following/amplitude controlling circuit 4 outputs a drive signal having a rectangular wave controlled in such a manner that the amplitude of the sensor signal matches a target value and the drive frequency matches the resonant frequency.

In order to match the drive frequency with the resonant frequency, there is a method for determining a frequency with which the amplitude can be maximum by slightly changing the frequency, for example. Moreover, there is a method for determining a frequency so that a phase difference between the drive signal and the sensor signal has a predetermined value. It is needless to say that the present invention is not restricted thereto.

When the drive signal is output from the resonant frequency following/amplitude controlling circuit 4 in this manner, this signal is amplified by the driver amplifier 5 and an electric current is applied to the drive coil of the scanner 1 so that the scanner 1 is continuously driven at the resonant frequency.

As described above, according to the first embodiment, when the drive signal has a rectangular wave, mutual induction does not occur in timing other than the leading edge and the trailing edge of the rectangular wave, in principle. Accordingly, it is possible to obtain a sensor signal to which the state of movement of the scanner 1 is precisely reflected.

In addition, the mutual induction component can be substantially completely removed from the sensor signal by eliminating the pulse-like signal component generated by the mutual induction from the sensor signal by the low pass filter 3. Additionally, the sensor signal to which the state of movement of the scanner 1 is precisely reflected can be obtained.

It is to be noted that the first embodiment can be improved/modified as follows.

That is, in order to eliminate unnecessary components in the sensor signal, a "band pass filter" for transmitting a specific frequency therethrough or a "notch filter" for eliminating a specific frequency can be a substitute for the above-described LPF 3.

Figure 8:
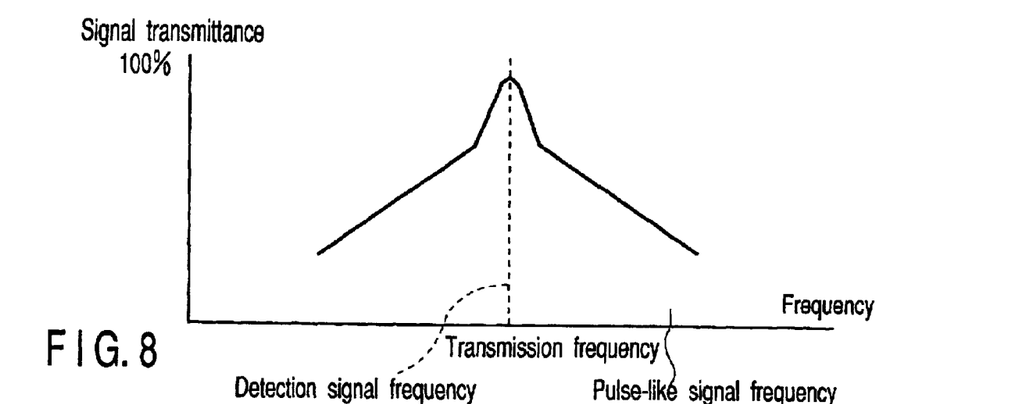
FIG. 8 is a view showing a frequency response characteristic example of a band pass filter.

In detail, when using the band pass filter, as shown in FIG. 8, only the original sensor signal can be separated and removed by matching the transmission frequency of the filter with the resonant frequency (=detection signal frequency) of the actuator.

Figure 9:
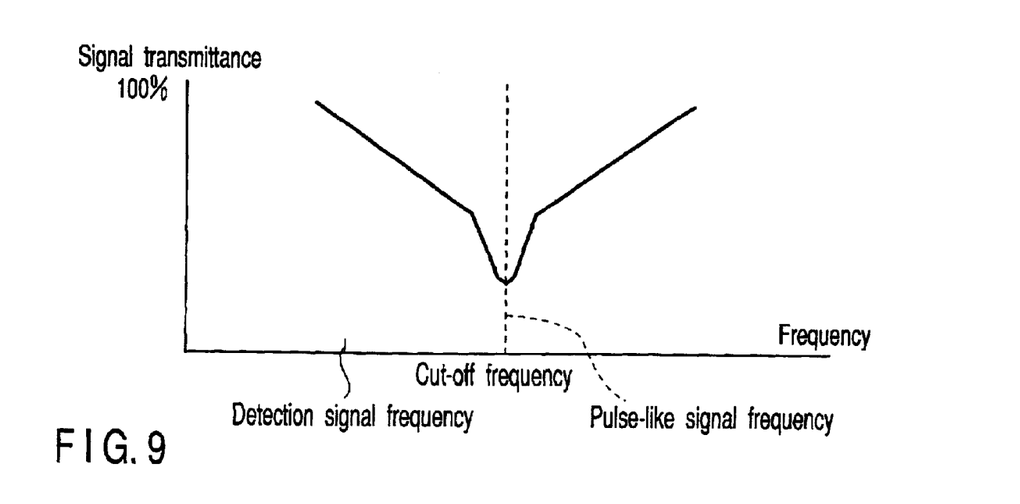
FIG. 9 is a view showing a frequency response characteristic example of a notch filter.

Further, when using the notch filter, as shown in FIG. 9, unnecessary components can be eliminated leaving the only original sensor signal, by matching the cut frequency of the filter with the frequency component of the pulse to which the mutual induction component is reflected.

Furthermore, although a complete rectangular wave of the drive signal is desirable, it may be difficult to be obtained in designing the circuit. In such a case, it may be possible to use a quasi-rectangular wave which has relatively sharp leading and falling edges and maintains a constant level between those edges. However, since the sharpness at the leading and falling edges is inferior to that of a rectangular wave, the frequency of the pulse obtained by the mutual induction component is lowered, and separation from the original sensor signal becomes somewhat difficult.

Here, when the filter is used as in the first embodiment, a phase shift is usually generated. When follow-up to the resonant frequency is carried out by using a phase difference between the drive signal and the detection signal, the phase of the signal which is shifted from that of the original detection signal is compared with the phase of the drive signal. Thus, follow-up to the frequency deviated from the resonant frequency may be possibly performed.

A description will now be given as to a second embodiment solving these problems.

Figure 10:
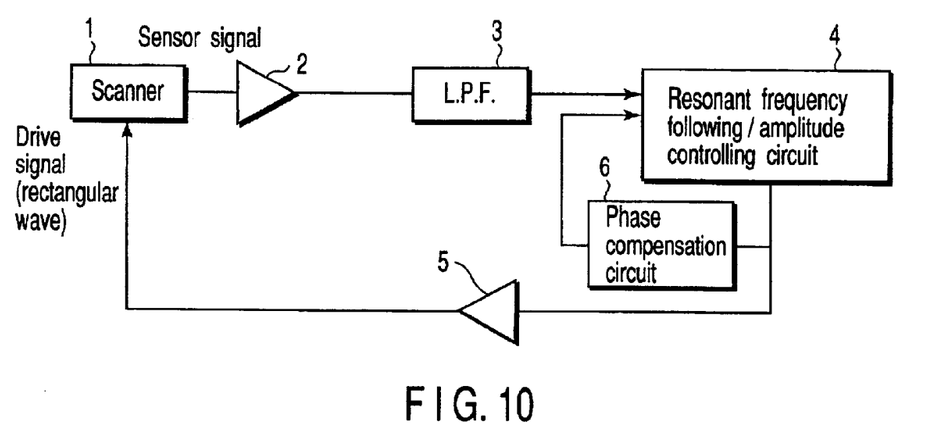
FIG. 10 is a block diagram showing the structure of an actuator drive apparatus according to a second embodiment of the present invention.
Figure 11:
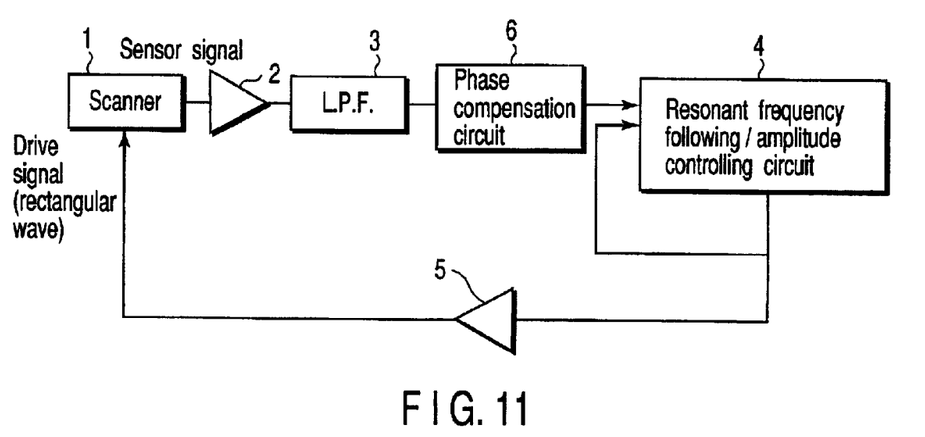
FIG. 11 is a block diagram showing the structure of the actuator drive apparatus according to the second embodiment of the present invention.

FIGS. 10 and 11 are block diagrams showing the structure of an actuator drive apparatus according to a second embodiment. It is to be noted that like reference numerals denote like or corresponding parts in FIG. 6 to omit explanation, and characteristic parts will be mainly described.

The structure shown in FIG. 10 is different from that in FIG. 6 in that a phase compensation circuit 6 is provided on the feedback path from the resonant frequency following/amplitude controlling circuit 4. On the other hand, the structure shown in FIG. 11 is different from that in FIG. 6 in that an output of the LPF 3 is connected to an input of the resonant frequency following/amplitude controlling circuit 4 through the phase compensation circuit 6.

Other structures are similar to that of the first embodiment.

As described above, according to the second embodiment, by using the phase compensation circuit 6 to generate the phase shift equivalent to that caused by the LPF 3, it is possible to prevent the phase of the signal shifted from that of the original detection signal from being compared with the phase of the drive signal to follow the frequency deviated from the resonant frequency.

Although the embodiments according to the present invention have been described above, the present invention is not restricted thereto, and various modifications are possible without departing from its scope.

For example, in the above-described embodiments, description has been given taking the electromagnetic optical scanner as a drive target of the actuator drive apparatus according to the present invention for instance, the present invention is not restricted thereto and can of course be applied to various kinds of devices presupposing the operation in the resonance state such as an acceleration sensor or an angular velocity sensor (gyro).

Furthermore, the filter does not have to necessarily be used to eliminate an unnecessary signal, and it is possible to adopt a technique which intentionally generates a signal on a level equal to that of an unnecessary signal and adds the resulting signal with the polarity being reversed to the unnecessary signal, for example.

It is to be noted that the structure in which the magnet is provided on a movable plate and the drive coil is provided to the fixed section may be employed.

As described above, according to the present invention, it is possible to provide an actuator drive apparatus capable of eliminating the influence of the mutual induction effect of the drive coil and the detection coil with a simple structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An actuator drive apparatus comprising:
   a movable section;
   a fixed section;
   an elastic member for connecting said movable section with said fixed section;
   a magnetic field generation member;
   a drive coil provided on the movable section, the drive coil being driven with a drive signal having a rectangular wave to generate a vibration of the movable section;
   a detection coil provided on the movable section for detecting an angular velocity of the vibration of the movable section;
   a high frequency elimination circuit for eliminating a specific high frequency component of an output signal of said detection coil; and
   a control circuit for applying the drive signal having the rectangular wave to said drive coil, said movable section thereby making a movement relative to said fixed section in the resonance state, said control circuit feeding back an output signal of said detection coil from which said specific high frequency component is eliminated to said drive signal, thereby maintaining said movement of said movable section relative to said fixed section in the resonance state;
   wherein said specific high frequency component is generated due to mutual induction of said drive coil and said detection coil and appears in said output signal of said detection coil in synchronism with a leading and trailing edge of the rectangular wave.

2. The actuator drive apparatus according to claim 1, wherein said high frequency elimination circuit is any one of a low pass filter, a notch filter, and a band pass filter.

3. The actuator drive apparatus according to claim 2, further comprising a phase compensation circuit for compensating for a change in phase caused by said high frequency elimination circuit.

4. The actuator drive apparatus according to claim 2, wherein said high frequency elimination circuit is a low pass filter.

5. An actuator drive apparatus comprising:
   a movable section;
   a fixed section;
   an elastic member for connecting said movable section with said fixed section;
   magnetic field generating means;
   a drive coil provided on the movable section, the drive coil being driven with a drive signal having a rectangular wave to generate a vibration of the movable section;
   a detection coil provided on the movable section for detecting an angular velocity of the vibration of the movable section;
   high frequency eliminating means for eliminating a specific high frequency component of an output signal of said detection coil, and
   controlling means for applying the drive signal having the rectangular wave to said drive coil, said movable section thereby being driven relative to said fixed section in the resonance state, said controlling means thereby feeding back an output signal of said detection coil from which said specific high frequency component is eliminated to said drive signal, a movement of said movable section relative to said fixed section thereby being maintained in the resonance state;
   wherein said specific high frequency component is generated due to mutual induction of said drive coil and said detection coil and appears in said output signal of said detection coil in synchronism with a leading and trailing edge of the rectangular wave.

6. The actuator drive apparatus according to claim 5, wherein said high frequency eliminating means is any one of a low pass filter, a notch filter, and a band pass filter.

7. The actuator drive apparatus according to claim 6, further comprising a phase compensating means for compensating for a change in phase caused by said high frequency eliminating means.

8. An actuator drive method for resonating and driving an actuator including a movable section, a fixed section, an elastic member for connecting said movable section with said fixed section, a magnetic field generation member, a drive coil, and a detection coil, said actuator drive method comprising:
   a step of applying a drive signal having a rectangular wave to said drive coil;

a step of eliminating a specific high frequency component of an output signal of said detection coil, said specific high frequency component being generated due to mutual induction of said drive coil and said detection coil and appearing in said output signal of said detection coil in synchronism with a leading and trailing edge of the rectangular wave; and a step of feeding back an output signal from which said specific high frequency component is eliminated to said drive signal.

9. The actuator drive method according to claim 8, wherein said step of eliminating said high frequency component transmits only a signal having a frequency component lower than a desired frequency by a low pass filter.

10. The actuator drive method according to claim 8, further comprising a step of compensating for a change in phase caused by said step of eliminating said high frequency component.

* * * * *